United States Patent
Carter et al.

(10) Patent No.: US 9,966,656 B1
(45) Date of Patent: May 8, 2018

(54) BROADBAND RECTENNA

(71) Applicant: Aeternum, LLC, Dulles, VA (US)

(72) Inventors: Paul Carter, Dulles, VA (US); Yi Huang, Liverpool (GB); Chaoyun Song, Birkenhead (GB)

(73) Assignee: Aeternum LLC, Dulles, VA (US)

( * ) Notice: Subject to any disclaimer, the term of this patent is extended or adjusted under 35 U.S.C. 154(b) by 0 days. days.

(21) Appl. No.: 15/345,681

(22) Filed: Nov. 8, 2016

(51) Int. Cl.
  *H01Q 1/24* (2006.01)
  *H01Q 9/28* (2006.01)
  *H01Q 9/06* (2006.01)

(52) U.S. Cl.
  CPC ............. *H01Q 1/248* (2013.01); *H01Q 9/065* (2013.01); *H01Q 9/285* (2013.01)

(58) Field of Classification Search
  CPC ................................ H01Q 1/248; H01Q 9/285
  USPC ........................................................ 343/795
  See application file for complete search history.

(56) References Cited

U.S. PATENT DOCUMENTS

| | | | |
|---|---|---|---|
| 5,867,131 A * | 2/1999 | Camp, Jr. | ............. G06F 1/1616 343/702 |
| 7,084,605 B2 | 8/2006 | Mickle et al. | |
| 7,145,517 B1 | 12/2006 | Cheng | |
| 7,268,517 B2 | 9/2007 | Rahmel et al. | |
| 7,400,253 B2 | 7/2008 | Cohen | |
| 7,528,698 B2 | 5/2009 | Mickle et al. | |
| 7,907,899 B1 | 3/2011 | Oliver | |
| 7,956,572 B2 | 6/2011 | Zane et al. | |
| 8,035,335 B2 | 10/2011 | Duron et al. | |
| 8,045,947 B2 | 10/2011 | Mandal et al. | |
| 8,115,683 B1 | 2/2012 | Stefanakos et al. | |
| 8,130,164 B2 | 3/2012 | Semonov et al. | |
| 8,330,298 B2 | 12/2012 | Scherbenski et al. | |
| 8,362,745 B2 | 1/2013 | Tinaphong | |
| 8,847,824 B2 | 9/2014 | Kotter et al. | |

(Continued)

FOREIGN PATENT DOCUMENTS

| | | |
|---|---|---|
| JP | 2006074188 A | 3/2006 |
| JP | 2015043551 A | 3/2015 |

(Continued)

OTHER PUBLICATIONS

Wang, et al., "RF Energy Harvesting with Broadband Antenna", ITEC Asia-Pacific 2014 1569942867, 5 pages.

(Continued)

*Primary Examiner* — Robert Karacsony
(74) *Attorney, Agent, or Firm* — Banner & Witcoff, Ltd.

(57) ABSTRACT

A rectenna for high efficiency RF-to-DC wireless energy harvesting that includes an off-center-fed dipole antenna and a rectifying circuit, wherein the rectifying circuit comprises at least one rectifying diode. The input impedance of the antenna may be directly conjugate matched to the impedance of the rectifying circuit over a wide range of frequencies and/or under different operating conditions. The impedance matching network required by a conventional rectenna system may therefore be eliminated using the methods disclosed for the design and implementation of the rectenna. The rectenna offers consistently high RF-to-DC power conversion efficiency over a wide range of frequencies and under different operating conditions. The rectenna may be connectible to a rectifying circuit utilizing different types of rectifying diodes.

19 Claims, 17 Drawing Sheets

(56) References Cited

U.S. PATENT DOCUMENTS

| | | | |
|---|---|---|---|
| 8,860,617 | B1 | 10/2014 | Fenick |
| 8,878,742 | B1 | 11/2014 | Jenn |
| 8,906,523 | B2 | 12/2014 | Brantner |
| 8,968,296 | B2 | 3/2015 | McPherson |
| 9,197,143 | B1 | 11/2015 | Townsend et al. |
| 9,318,898 | B2 | 4/2016 | John |
| 9,472,849 | B2 | 10/2016 | Shin et al. |
| 2007/0087719 | A1* | 4/2007 | Mandal ............... H01Q 1/22 455/299 |
| 2009/0102296 | A1 | 4/2009 | Greene et al. |
| 2009/0117872 | A1 | 5/2009 | Jorgenson et al. |
| 2009/0152954 | A1 | 6/2009 | Le et al. |
| 2009/0174361 | A1 | 7/2009 | Duron et al. |
| 2009/0256769 | A1 | 10/2009 | Kan et al. |
| 2011/0101789 | A1 | 5/2011 | Salter, Jr. et al. |
| 2012/0106103 | A1 | 5/2012 | Nohra |
| 2012/0176289 | A1 | 7/2012 | Lee |
| 2014/0266967 | A1 | 9/2014 | Ramahi et al. |
| 2014/0290950 | A1 | 10/2014 | Welsh et al. |
| 2014/0361629 | A1 | 12/2014 | Moon et al. |
| 2015/0048682 | A1 | 2/2015 | Murley |
| 2015/0229165 | A1 | 8/2015 | Hanein et al. |
| 2015/0236551 | A1 | 8/2015 | Shearer et al. |
| 2015/0256097 | A1 | 9/2015 | Gudan et al. |
| 2015/0372541 | A1 | 12/2015 | Guo et al. |
| 2015/0380973 | A1 | 12/2015 | Scheb |
| 2016/0020636 | A1 | 1/2016 | Khlat |
| 2016/0261031 | A1* | 9/2016 | Dion ............... H01Q 1/248 |

FOREIGN PATENT DOCUMENTS

| | | |
|---|---|---|
| WO | 2015/019106 A2 | 2/2015 |
| WO | 2015062545 A1 | 5/2015 |
| WO | 2015089437 A1 | 6/2015 |
| WO | 2016001020 A1 | 1/2016 |

OTHER PUBLICATIONS

Krishnan, et al., "Design and development of batch fabricatable metal-insulator-metal diode and mircostrip slot antenna as rectenna elements", ResearchGate, Article in Sensors and Actuators A Physical—Mar. 2008, 9 pages.

La Rosa, "Investigation of the Rectenna Concept for Millimeter Wave Applications", Graduate Theses and Dissertations, University of South Florida, Scholar Commons, 2007, 151 pages.

Keyrouz, et al., "Efficient Direct-Matching Rectenna Design for RF Power Transfer Applications", 5 pages.

Zhang, et al., "Design of a Compact Planar Rectenna for Wireless Power Transfer in the ISM Band", Research Article, Hindawi Publishing Corporation, International Journal of Antennas and Propagation, vol. 2014, Article ID 298127, 9 pages, <http://dx.doi.org/10.1155/2014/298127>, published Feb. 20, 2014, 10 pages.

S. Kim, et al., "Ambient RF Energy-Harvesting Technologies for Self-Sustainable Standalone Wireless Sensor Platforms," Proc. IEEE, vol. 102, No. 11, pp. 1649-1666, Nov. 2014.

J.O. McSpadden, et al., "Design and Experiments of a High Conversion Efficiency 5.8-GHz Rectenna," IEEE Trans. Microw. Theory Tech., vol. 46, No. 12, pp. 2053-2060, Dec. 1998.

H. Sun, et al., "A Dual-Band Rectenna Using Broadband Yago Antenna Array for Ambient RF Power Harvesting," IEEE Antennas and Wireless Propa. Lett., vol. 12, pp. 918-921, 2013.

D. Masotti, et al., "Genetic-Based Design of a Tetra-Band High-Efficiency Radio-Frequency Energy Sytem," Microw. Antennas Propag., vol. 7, No. 15, pp. 1254-1263, Jun. 2013.

K. Niotaki, et al., "A Compact Dual-Band Rectenna Using Slot-Loaded Dual Bandfolded Dipole Antenna," IEEE Antennas and Wireless Propa. Lett. vol. 12, pp. 1634-1637, 2013.

J.A. Hagerty, et al., "Recycling Ambient Microwave Energy with Broad-Band Rectenna Arrays," IEEE Trans. Microw. Theory Tech., vol. 52, No. 3, pp. 1014-1024, Mar. 2004.

V. Kuhn, et al., "A Multi-Band Stacked RF Energy Harvester with RF-to-DC Efficiency Up to 84%," IEEE Trans., Microw. Theory Tech., vol. 63, No. 5, pp. 1768-1778, May 2015.

C. Song, et al., "A High-Efficiency Broadband Rectenna for Ambient Wireless Energy Harvesting," IEEE Trans. Antennas Propag., vol. 63, No. 8, pp. 3486-3495, May 2015.

C. Song, et al., "A Novel Six-Band Dual CP Rectenna Using Improved Impedance Matching Technique for Ambient RF Energy Harvesting," IEEE Trans. Antennas Propag., May 2016.

Feb. 23, 2018—(EP) Communication and European Search Report—App EP17193424.

May 5, 2016—Okba, et al., "Multiband Rectanna for Microwave Applications," 2016 IEEE Wireless Power Transfer Conference (WPTC), IEEE, pp. 1-4.

Dec. 22, 2014—Chen, et lal., "Bowtie Nanoantennas with Symmetry Breaking," Journal of Nanophotonics, Society of Photo-Optical Instrumentation Engineers, vol. 9, No. 1, p. 93798.

Aug. 7, 2012—Sun, et al., "Design of a High-Efficiency 2.45-GHz Rectenna for Low-Input-Power Energy Harvesting," IEEE Antennas and Wireless Propagation Letters, IEEE, vol. 11, pp. 929-932.

Mar. 31, 2008—Qu, et al., "Wideband Periodic Endfire Antenna With Bowtie Dipoles," IEEE Antennas and Wireless Propagation Letters, vol. 7, pp. 314-317.

Sep. 25, 2012—Ta, et al., "Dual-band Printed Dipole Antenna with Wide Beamwidth for WLAN Access Points," Microwave and Optical Technology Letters, vol. 54, No. 12, pp. 2806-2811.

\* cited by examiner

BROADBAND RECTENNA

BACKGROUND

Embodiments herein relate to rectifying antennas (rectennas) for wireless power transfer. Some aspects of the disclosure are directed to broadband antennas (also known as wideband antennas), rectifying circuits or rectifiers, and techniques for eliminating impedance matching networks conventionally connected between the broadband antennas and the rectifiers.

Wireless power transfer (WPT), which converts electromagnetic energy (e.g., microwave, radio frequency (RF), etc.) to direct-current (DC) power, has been widely used in applications such as RF identification (RFID) and microwave energy powered unmanned aerial vehicle (UAVs). In recent years, due to the significant development in wireless communications, (e.g., cellular networks, wireless local area networks, etc.) wireless transmitters are conveying increasing amounts of electromagnetic energy over intervening space to various receivers (e.g., cellular base stations, wireless devices, antennas, etc.). Ambient wireless energy harvesting, which collects energy from electromagnetic waves in the environment, is a favorable technology for supplying continuous power to some self-sustainable standalone platforms (e.g., wireless sensors, smoke alarms, health monitors, etc.). A rectifying antenna (rectenna), which converts RF energy to DC power (RF-to-DC), has been a key solution in both aforementioned technologies.

Conventional single-band rectennas are typically capable of receiving RF power over a narrow frequency band and converting the received narrowband RF power to DC power. The DC power may be used to power devices (e.g., RFID devices, UAVs, etc.). Conventional multi-antenna and/or broadband antenna energy harvesting systems combine the output power from different single-band antennas, each of which have a single operating frequency, an associated impedance matching network and a rectifying circuit. The requirement for the multi-band and broadband rectennas to have a corresponding broadband and multi-band impedance matching networks increase costs and weight, reduce efficiency, and introduce performance variations associated with the complexities of the impedance matching networks.

Moreover, due to a non-linearity of operation of the rectifying circuit, the performance of broadband and multi-band rectennas using complex impedance matching networks is very sensitive to varying operating conditions, such as varying input power levels and varying loads.

A need exists for rectennas comprising simple structures and achieving consistent performance.

SUMMARY

Various methods and apparatus are provided for achieving high RF-to-DC power conversion efficiencies over a wide range of frequencies for broadband rectennas without the need for complex impedance matching networks connectible between the antennas and the rectifiers.

Various methods and apparatus are provided for achieving high RF-to-DC power conversion efficiencies for broadband rectennas without the need for impedance matching networks connectible between the antennas and the rectifiers.

According to various aspects, methods are provided for simplifying broadband rectenna structures to make them more compact, lightweight, low cost and compatible with printed circuit board-level integration.

According to various aspects, a structure for receiving broadband RF signals and accomplishing rectification of the received RF signals is disclosed. In some aspects, the connectible rectifying diode may be replaceable with various rectifying elements without sacrificing the high RF-to-DC power conversion efficiencies. In some embodiments, load impedance values may be well matched to the broadband rectenna such that the high RF-to-DC power conversion efficiency of the broadband rectenna may be maintained at different input power levels and different load values.

According to various embodiments, elements may be utilized for designing a rectenna including a modified off-center-fed (OCF) dipole antenna having three pairs of dipole arms fed by a coplanar stripline. The antenna may be configured to receive RF signals efficiently while a rectifying circuit is configured to convert RF power received from the antenna to a DC power output to power a load.

The OCF dipole antenna may include two asymmetric dipoles comprising a pair of asymmetric arms each and one dipole comprising a pair of symmetric arms. In various embodiments, the antenna may comprise at least six arms. The arms may be configured to have a radial stub structure for achieving higher impedance over a larger bandwidth, e.g., impedance over $100\Omega$ (up to $400\Omega$) over a 2 to 1 bandwidth. The asymmetric OCF dipole design may be employed for increasing the antenna impedance over a broad range of operating frequencies.

The first asymmetric dipole may be configured to have a first arm that is longer than a second arm. In some embodiments, a ratio of a length of the first arm to a length of the second arm may be approximately 7/3. The first arm may have a sector angle of 20-degree associated with the radial stub structure, while the second arm may have a sector angle of 30-degree associated with the radial stub structure. The 20-degree and the 30-degree sector angles associated with the radial stub structures are just examples and may be changed in order to optimize the OCF dipole antenna structure for achieving improved overall performance.

The second asymmetric dipole may be configured to have a third arm that is longer than a fourth arm. In some embodiments, a ratio of a length of the third arm to a length of the fourth arm may be approximately 7/3. The third arm may have a sector angle of 20-degree for the radial stub structure, while the fourth arm may have a sector angle of 30-degree for the radial stub structure.

The first and second asymmetric dipoles may be orthogonal to each other and have a pitch angle of 45-degree relative to the coplanar stripline.

The third symmetric dipole may have two identical arms and have a sector angle of 30-degree for the radial stub structure.

The third symmetric dipole may be orthogonal to the coplanar stripline and have a pitch angle of 45-degree relative to the first and second asymmetric dipoles.

The antenna may include a substrate with the OCF dipole antenna structure (e.g., patch) disposed thereon, with no metallic plane or ground plane required to be positioned below the antenna structure.

In some embodiments, the rectifier may include a single shunt diode rectifier, which may include a shunt diode, a series RF choke, and a low pass filter that may be connected to a load. The diode may be a Schottky GaAs diode, while the RF choke may be an inductor for removing high frequency AC components generated by the diode and/or a non-linear rectifying element. The low pass filter may be a shunt capacitor configured to reduce a peak-to-peak ripple voltage output from the rectifier so that a stable DC power may be supplied to the load. The load may have an impedance and/or resistive value. For example, the load may be a resistor, or a super capacitor, or a DC-DC boost converter.

In some embodiments, the rectifier may connect to the OCF dipole antenna directly, without using an impedance matching network to transform the impedance of the rectifier to a resistive port (e.g. 50 ohms). The aforementioned OCF dipole antenna may have a high impedance which may provide a conjugate match to the impedance of the rectifier.

In some embodiments, the rectenna may have an operating frequency around 0.9 GHz.

In some embodiments, the rectenna may have a wide range of operating frequencies or a large frequency bandwidth ranging from approximately 1.8 GHz up to 2.45 GHz.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skills in the art from the detailed description.

BRIEF DESCRIPTION OF THE DRAWINGS

Embodiments are herein described, by way of example only, with reference to the accompanying drawings, wherein.

DETAILED DESCRIPTION

Figure 1A:
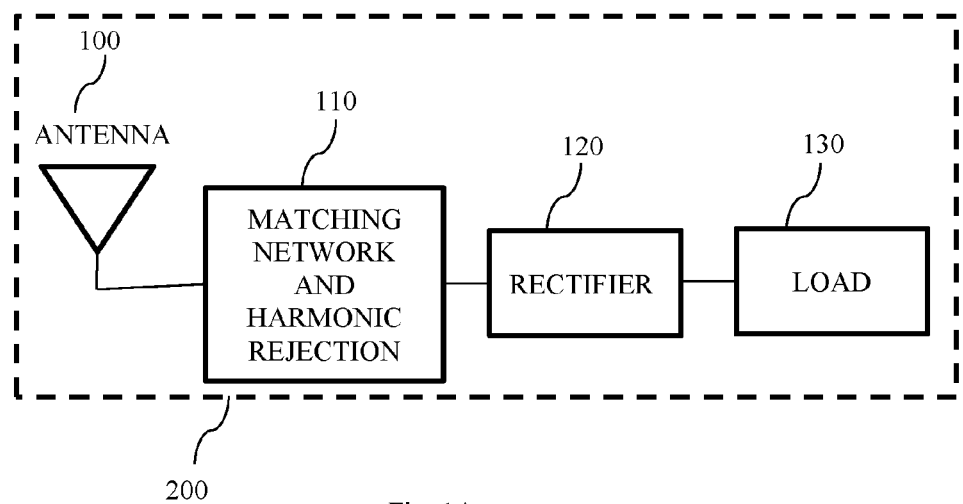
FIG. 1A shows a rectifying antenna (rectenna) system.

Reference will now be made in detail to features of the embodiments, examples of which are illustrated in the accompanying drawings, wherein like reference numerals refer to the like elements throughout. The features are described below to explain the embodiments by referring to the figures.

The term "and/or" includes any and all combinations of one or more of the associated listed items.

Hereinafter, description will be given of embodiments disclosed herein in more detail with reference to the accompanying drawings. In describing various aspects, the same component on different drawings may be designated by the same reference numeral, and repetitive description of the same component will be omitted.

FIG. 1A shows a conventional rectifying antenna system. A conventional rectenna 200 may consist of a receiving antenna 100, an impedance matching network 110, a rectifying circuit and/or a rectifier 120, and a load 130. The impedance matching network 110 connectible between the antenna 100 and the rectifier 120 may affect the operating frequency, the RF-to-DC power conversion efficiency and the complexity of the system.

The impedance matching network 110 may be configured to reject higher harmonic signals generated by non-linear rectifying elements of the conventional rectenna system. Higher harmonic signal rejection by the impedance matching network 110 may prevent losses associated with the higher harmonic signals that may be re-radiated by the antenna 100 as power lost.

It is very challenging to design an impedance matching network with harmonic rejection for multi-band or broadband rectennas, because the impedance of the rectifier 120 varies not only with the frequency, but also with input power levels and load values. Therefore, the structure of the impedance matching network 110 may be very complex for the multi-band and the broadband rectennas, and this may introduce errors in manufacturing and other additional problems.

The conventional rectenna system as shown in FIG. 1A is not favorable for broadband and multi-band rectennas. Hereinafter, a description will be given on the new technology to design a high efficiency broadband rectenna without using the impedance matching network.

Figure 1B:
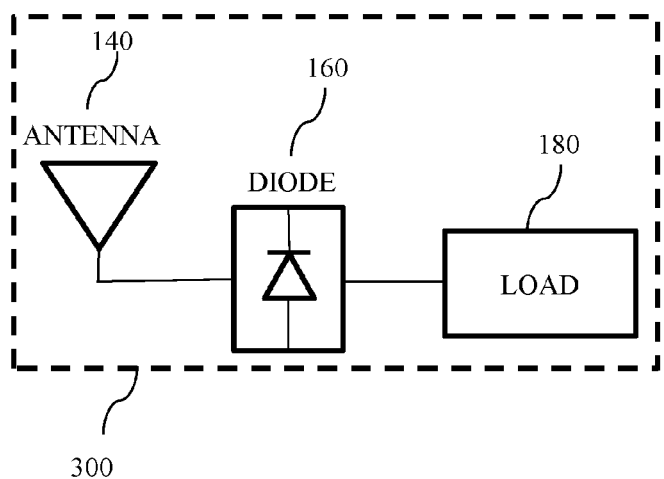
FIG. 1B shows a configuration view of a rectenna system according to various embodiments.

FIG. 1B shows a rectenna system according to various embodiments. The rectenna 300 may comprise a receiving antenna 140, a rectifying diode and/or rectifying circuit 160, and a load 180 which may be connectible to the rectenna. In some aspects, the load 180 may be connected to the output of the rectifying diode 160.

The antenna 140, according to a feature of the embodiments, may be configured to provide a high input impedance over a broad frequency range. The input impedance may be controlled and tuned to an optimized value, wherein the optimized value of the input impedance may be conjugate matched to an impedance of a rectifying diode and/or a rectifying circuit 160 (e.g., to within 50 percent for a reflection coefficient smaller than −6 dB). In some aspects, a conventional rectifying circuit 160 comprising Schottky barrier diodes may have a complex input impedance, wherein the real part of the impedance may vary between 100Ω to 400Ω and the imaginary part of the impedance may vary between −700Ω and 0Ω. The reasons that could cause such variations in the impedance of the conventional rectifying circuit 160 may include different operating conditions such as frequency, input power level and load value, as well as the different characteristics of the rectifying diodes. According to a feature of the embodiments, the antenna 140, may have a complex output impedance, wherein the complex output impedance may be tunable from a low value (e.g., 50Ω) to a relatively high value (e.g., up to 400Ω) based on systematic design variations of the antenna 140 structure. The optimized value of the impedance that can match the input impedance of the rectifier could be selected. The impedance matching network can therefore be eliminated while the rectenna may provide high power conversion efficiencies over a broad range of operating frequencies.

Since both the impedance of the antenna 140 and the impedance of the rectifier 160 may be of high values (e.g., over 150Ω for the real part, −300 to 0Ω for the imaginary part), a reflection coefficient ($S_{11}$) value for the rectenna 300 may be low (e.g. $S_{11}$<−10 dB) for a wide range of operating parameters (such as frequency of operation, input power level, and types of load, etc.). The high impedance conjugate matching system for the rectenna 300 may reduce effects on $S_{11}$ caused by non-linearity (e.g., impedance variation of the rectifier against frequency, input power level, and load impedance) present in operating parameters of the rectifying circuit. In some variations, an impedance matching network of a conventional broadband rectenna may be eliminated by using the rectenna 300 and may provide more consistent and stable operational performance than the conventional rectennas 200 comprising the matching network 110 as depicted in FIG. 1A.

In some embodiments, the effects on the reflection coefficient of the rectenna 300 caused by differing impedances associated with different rectifiers may also be significantly reduced due to the high impedance of the rectenna 300. Thus, the rectenna 300, in accordance to some of the embodiments described herein, may have consistent performance while using different rectifying diodes or rectifying circuits. More particularly, the rectenna 300 may still maintain its broad bandwidth and high power conversion efficiency while using different types of Schottky diodes and rectifying topologies. This advantage is normally not available in conventional rectennas that use a 50Ω port and corresponding matching networks, since the effects on the reflection coefficient due to the impedance variation could be very large in such a low impedance (50Ω) matching system.

A single off-center-fed (OCF) dipole antenna is a dipole with asymmetrical arms. The OCF dipole antenna, with two asymmetrical dipole arms of unequal lengths, is different from a conventional center-fed dipole antenna having symmetrical dipole arms of equal lengths. One application of the OCF dipole is to realize a multiband antenna, since the resonant center-fed dipole has its fundamental frequency at $f_0$ and harmonics at $3f_0$, $5f_0$, $7f_0$, and so on. While the OCFD can resonate at $f_0$, $2f_0$, $4f_0$, and $8f_0$ by offsetting the feed by $\lambda/4$ from the center. Such OCFDs are very popular in the amateur radio community. But, one of the major problems of the OCFD is that the radiation resistance of the antenna could be very high, thus it is required to use a 4:1 or 6:1 balun transformer to convert the impedance to the feeding port 50 ohms resistance. This is a disadvantage for most of those applications (in a conventional 50Ω feed system) using OCFDs, but this feature could be used in the proposed rectenna design. The OCFD may be well configured with a rectifier without using matching networks since the rectifiers are normally of high input impedance (e.g. >200Ω) as well.

Figure 2:
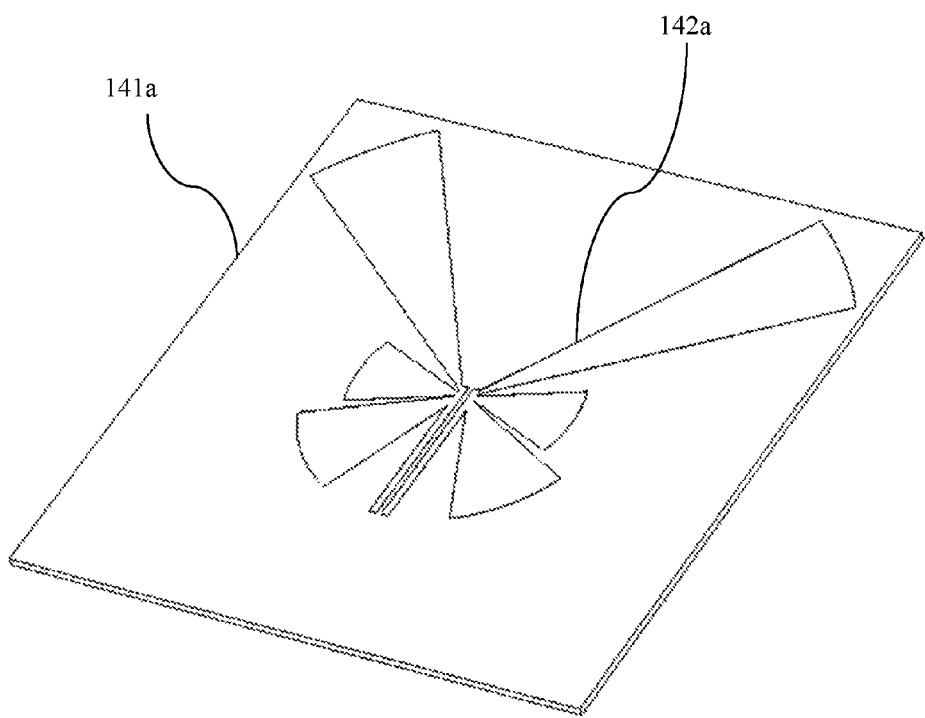
FIG. 2 shows a perspective view of an antenna according to various embodiments.

In accordance with various embodiments, FIG. 2 illustrates a wideband high impedance off-center-fed (OCF) dipole antenna 142a, which may be printed on a single-sided substrate 141a (e.g., a printed circuit board (PCB) such as FR4, Rogers RTduroid5880, and 6002). The substrate 141a may, for example, have a relative permittivity of around 2 to 6 and a thickness of around 1 to 3 mm. A size of the PCB may be equal to approximately 120 mm$^2$×120 mm$^2$. There may be no need for a metallic ground plane below the rectenna 142A and/or attached to the substrate.

The OCF dipole antenna 142a, in accordance to some embodiments, may comprise a very high input impedance (e.g., over 150Ω and up to 400Ω) at the interface to the rectifier. The reason is that the current at the feed point of an asymmetrical OCF dipole may be smaller than that of a center-fed (e.g., symmetrical) dipole in the case of half-wavelength dipoles. For two dipoles that are of substantially similar electrical lengths and radiating substantially similar power, a radiation resistance of the asymmetrical OCF dipole may be larger than that of the symmetrical dipole since the power radiated by the dipole can be expressed as $P=I^2R$, where I is the current at the feed point and R is the radiation resistance. To gain a better understanding, a simple half-wavelength dipole is simulated in free space by using the CST Microwave Studio® software, wherein the arms of the dipole are made of copper wires with a diameter of 1 mm. The total length of the dipole is about 100 mm, thus the resonance frequency of the half-wavelength dipole is about 1.5 GHz. The real part and imaginary part of the impedance at 1.5 GHz are shown in Table I for different feed locations. Five different scenarios are listed, namely, the ratio of the length of the long arm to the length of the short arm is increased from 1 (center-fed dipole; long arm: 50 mm, short arm: 50 mm) to 9 (OCF dipole; long arm: 90 mm, short arm: 10 mm).

TABLE I

SIMULATED INPUT IMPEDANCE OF THE DIPOLE WITH DIFFERENT FEED LOCATIONS

| Long arm (mm) | Short arm (mm) | Real part at $f_0$ (Ω) | Imaginary part at $f_0$ (Ω) |
|---|---|---|---|
| 90 | 10 | 320 | −213 |
| 80 | 20 | 165 | −30 |
| 70 | 30 | 102 | −0.8 |
| 60 | 40 | 79 | 5.6 |
| 50 | 50 | 73 | 6.4 |

From Table I, the impedance values listed for the last row correspond to the center-fed dipole design, since the two arms of the dipole are substantially similar and of approximately 50 mm in length. The impedance values for the other rows of Table 1, wherein the ratios of the length of the longer arm to the length of the shorter arm are 6/4, 7/3, 8/2, and 9/1 respectively, correspond to the OCF dipole design. From Table I, it is apparent that the radiation resistance (real part) of the center-fed dipole is about 73Ω, which is lower than that for the OCF dipoles. The OCF dipole design enables an approximate 4.4 fold increase in the value of the input impedance from approximately 73Ω to approximately 320Ω by increasing the ratio of the length of the longer arm to the length of the shorter arm to about 9/1. The imaginary part of the input impedance may be maintained nearly constant, from approximately 0Ω to approximately 6Ω, for a 7/3 or less ratio of longer to shorter arm length. Therefore, the value of the impedance of the OCF dipole may be tuned to desired high and/or low impedance values by modifying the aforementioned ratio. In addition, if the center-fed half-wavelength dipole is of broad bandwidth (e.g. with a fractional bandwidth>10%), the impedance within the bandwidth of interest may be increased by modifying the center-fed dipole to the OCF dipole design.

Figure 3A:
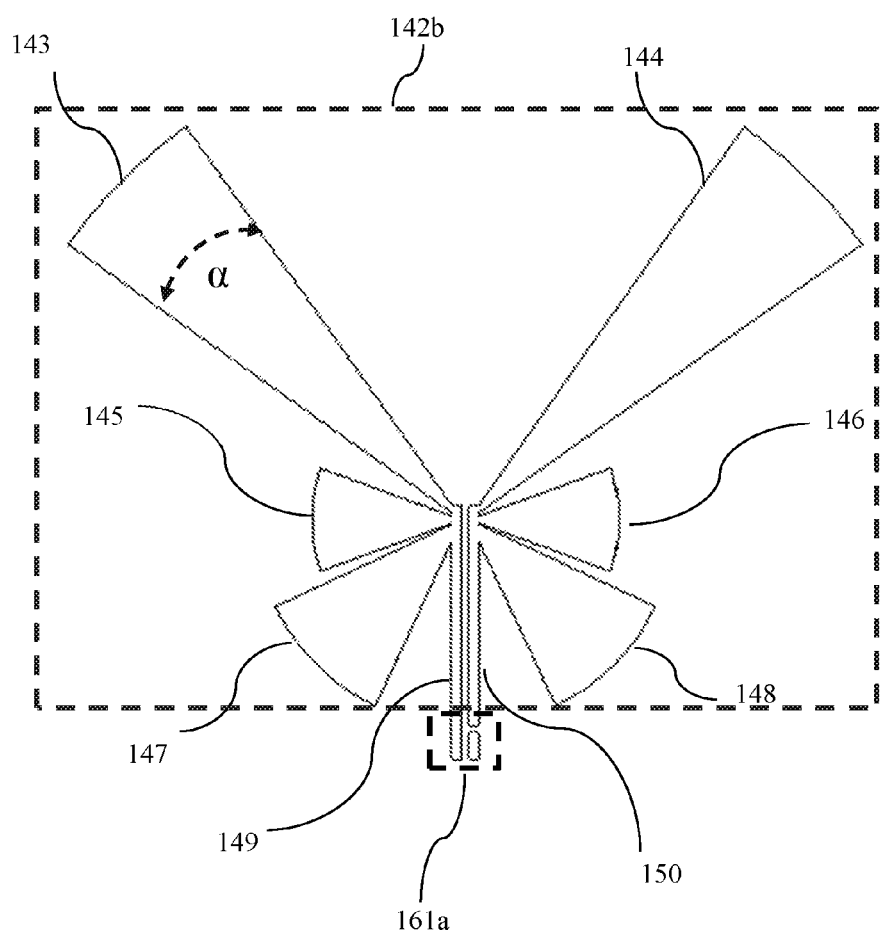
FIGS. 3A and 3B show rectenna systems each comprising an antenna and a rectifier according to various embodiments.

FIG. 3A shows an example hardware configuration for a rectenna. A rectifier 161a (which may be similar to, and/or correspond to the diode or rectifying circuit 160 of FIG. 1B) connects to the OCF dipole antenna 142b in accordance with various embodiments. While this embodiment illustrates three dipoles, other embodiments may include more dipoles or less dipoles depending upon the application.

In some embodiments, the antenna 142b may consist of three dipoles fed by the coplanar stripline comprising a first conducting strip 149 and a second conducting strip 150. A first dipole may be an asymmetric dipole that may comprise two dipole arms 143 and 148 of unequal lengths. The first dipole arm 143 and the second dipole arm 148 may be electrically connected to the first conducting strip 149 and the second conducting strip 150, respectively. In some embodiments, a sum of the length of the first dipole arm 143 and the length of the second dipole arm 148 may correspond to a half wavelength at a resonance frequency. In some embodiments, a ratio of a length of the first dipole arm 143 to a length of the second dipole arm 148 may be 7/3. This may increase an impedance of the antenna 142b at the resonance frequency. As illustrated in Table I, when the aforementioned ratio is less than 7/3, the real part of the impedance of the dipole can be increased while the imaginary part of the impedance may remain substantially constant. Therefore, in various embodiment of antenna 142a, the ratio is selected as 7/3 in order to avoid the impedance mismatch due to the large variation of the imaginary part of the impedance and improve the impedance matching performance of the final rectenna. In some embodiments, the length of the first dipole arm 143 may be greater than twice but less than three times (2≤ratio≤3) the length of the second dipole arm 148. Likewise, the length of the second dipole arm 148 may be greater than the length of the first dipole by a similar ratio (2≤ratio≤3).

FIG. 3A shows that the second asymmetric dipole comprising the third arm 144 and the fourth arm 147 is substantially similar to the first asymmetric dipole comprising the first arm 143 and the second arm 148 except for a spatial orientation of the first asymmetric dipole which is orthogonal relative to a spatial orientation of the second asymmetric dipole. The ratio between the length of the third arm 144 and the length of the fourth arm 147 may be the same as the first dipole, e.g., approximately 7/3, 2≤ratio≤3. Both the OCF (e.g., asymmetric) dipoles have a pitch angle of 45-degree to the first conducting strip 149 and the second conducting strip 150. The third symmetric dipole is structurally different from the asymmetric dipoles with two arms, namely the fifth arm 145 and the sixth arm 146 that are the same or about the same length. In some embodiments, a total length of the third dipole or a sum of the lengths of the fifth and the sixth arm, may be shorter than the first two dipoles, e.g., about 45 mm.

The antenna 142b in accordance to the features of various embodiments consists of two OCF asymmetric dipoles and a symmetric dipole, wherein the antenna has at least six arms. The dipole arms may have a radial stub structure for realizing a wider impedance bandwidth. Thus the antenna could obtain a relatively high input impedance (e.g. from 150 to 400Ω) within the frequency range of interest. The high impedance of the antenna in accordance with various embodiments mainly relies on the ratio of the length of the longer arm to the length of the shorter arm, as previously discussed in Table I. More particularly, a larger ratio may result in a higher value for the impedance while a smaller ratio may produce a lower value for the impedance. The bandwidth (frequency range of operation) of the antenna may result from the radial stub (bow-tie) structure for the arms of the dipole. More particularly, a wider bandwidth may be realized for the radial stub with a large sector angle α (e.g., greater than 30 degrees but less than 90 degrees), while a narrower bandwidth may be realized for the radial stub with a small sector angle α (e.g., greater than 5 degrees but less than 30 degrees). The aforementioned two parameters, namely the radial stub structure and the sector angle, may be critical for the design of the high impedance, broadband rectenna 300 and may be optimized to achieve desired performance metrics of high conversion efficiency (e.g., greater than 30%), high output power (e.g., greater than 10 dBm), etc.

In some embodiments, arms 143 and 144 may have an equal dimension, wherein a sector angle may be 20-degree for the radial stub structure, and/or a corresponding radius may be 70 mm for the radial stub structure. Arms 145 and 146 may have an equal dimension, wherein a sector angle may be 30-degree for the radial stub structure, and/or a corresponding radius may be 22.5 mm. Arms 147 and 148 may have an equal dimension, wherein a sector angle may be 30-degree for the radial stub structure, and/or a corresponding radius may be 30 mm. In some embodiments, the first conducting strip 149 and the second conducting strip 150 may have a strip width of 1.5 mm and a length of 32 mm. A gap between the first conducting strip and the second conducting strip may be 1 mm.

Figure 3B:
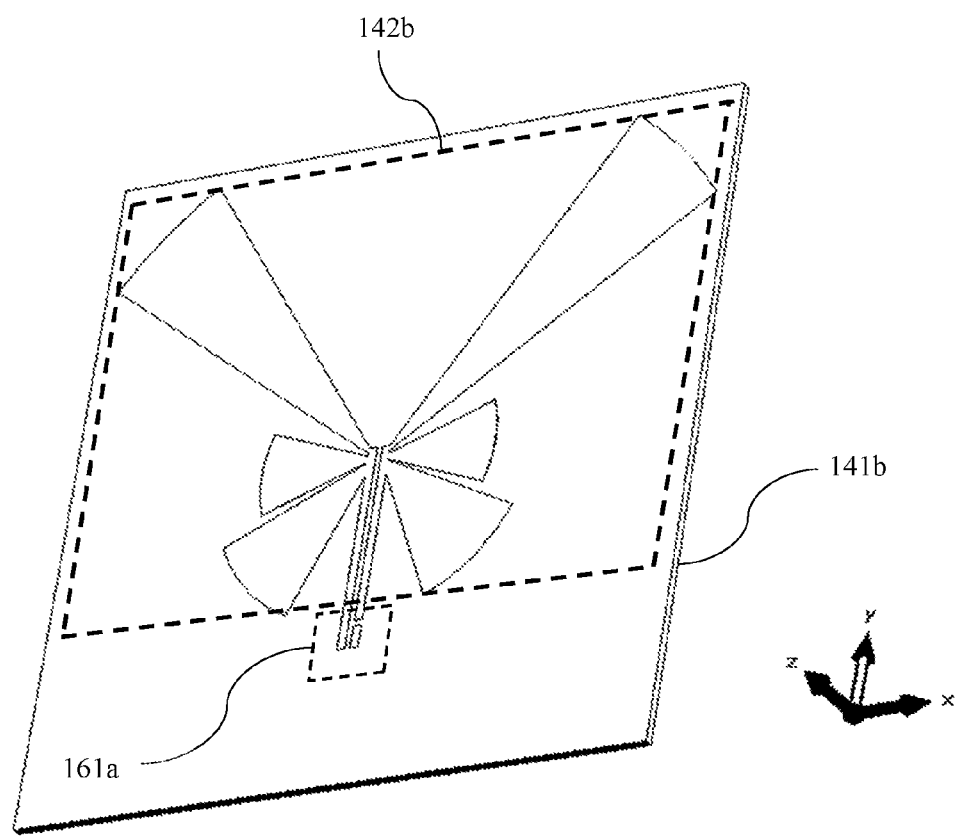

The rectifier 161a, in accordance to the some embodiments, may be directly connected to the antenna 142b without using impedance matching networks. FIG. 3B provides a perspective view of the OCF antenna 142b configured with the rectifier 161a. The rectifier 161a is connected to the parallel conducting strips extended from the antenna 142b. In some embodiments, the rectenna including the antenna 142b and the rectifier 161a may be printed on substrate 141b (e.g., a one-sided Duroid® 6002 substrate made by Rogers Corporation) with a relative permittivity of approximately 2.94 and a thickness of approximately 1.52 mm. In various embodiments, the size of the PCB 141b may be 120×120 $mm^2$. Since the impedance matching network could be eliminated by using some embodiments disclosed herein, the rectifier 161b may consist of a single diode and a load.

Figure 4:
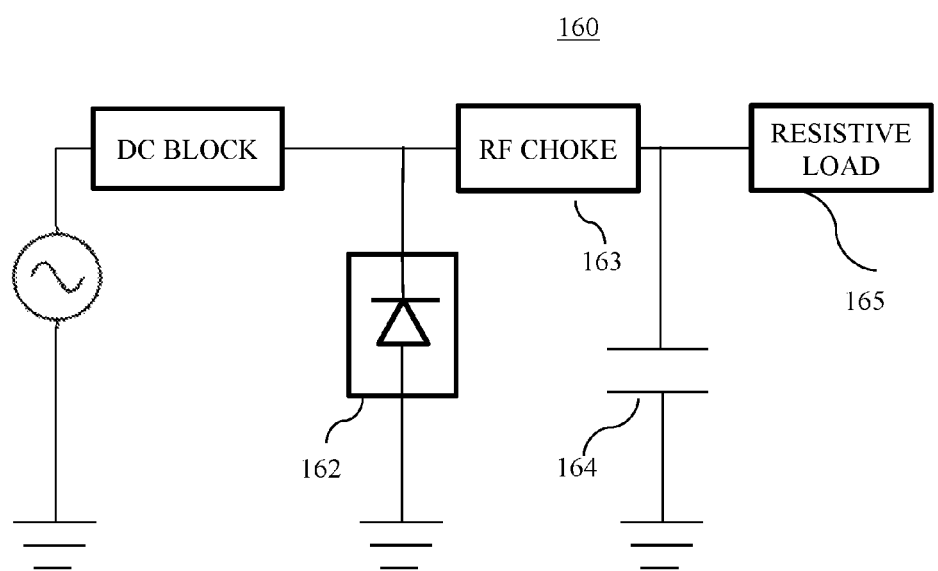
FIG. 4 shows a schematic of a circuit according to various embodiments.

FIG. 4 is a schematic view of a dipole, represented by an AC source and DC Block, connected to a single shunt diode rectifier in accordance with various embodiment disclosed herein. The single shunt diode rectifier may have a high maximum theoretical power conversion efficiency (up to 90%) and a simple circuit topology in comparison to other rectifiers or rectifying circuits that may be capable of achieving similar efficiencies. Thus, the single shunt diode rectifier may be selected as part of the rectenna 300 system. FIG. 4 shows the rectifier 160 that may consist of a shunt rectifying diode 162 (such as a Schottky GaAs diode), an RF choke 163 for removing the AC components generated from the diode 162, a shunt capacitor 164 for smoothing the output DC voltage waveform and a resistive load 165. The RF choke 163 may be an inductor while the resistive load 165 may be a resistor, a super capacitor, and/or a DC-DC boost converter.

Figure 5A:
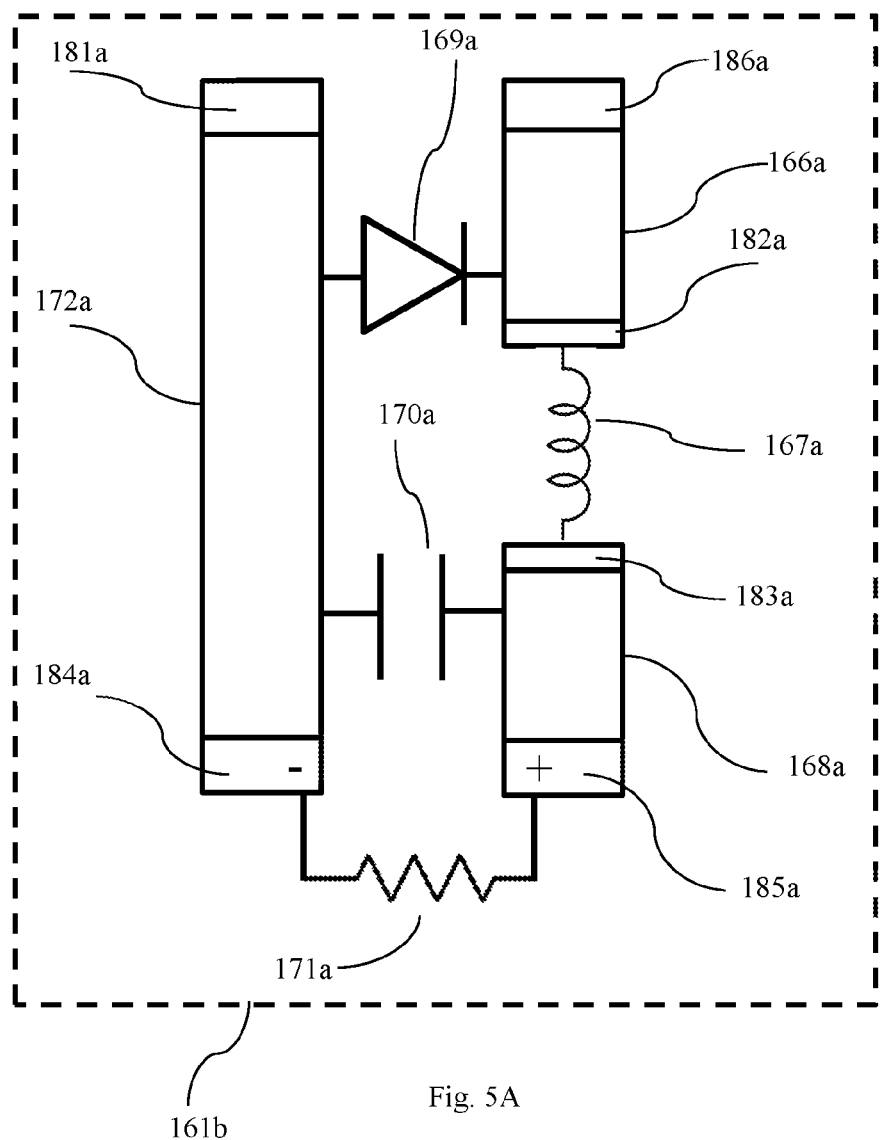
FIG. 5A shows a configuration of the circuit of FIG. 4 connected to the feed line of the antenna of FIG. 2 according to various embodiments.
Figure 5B:
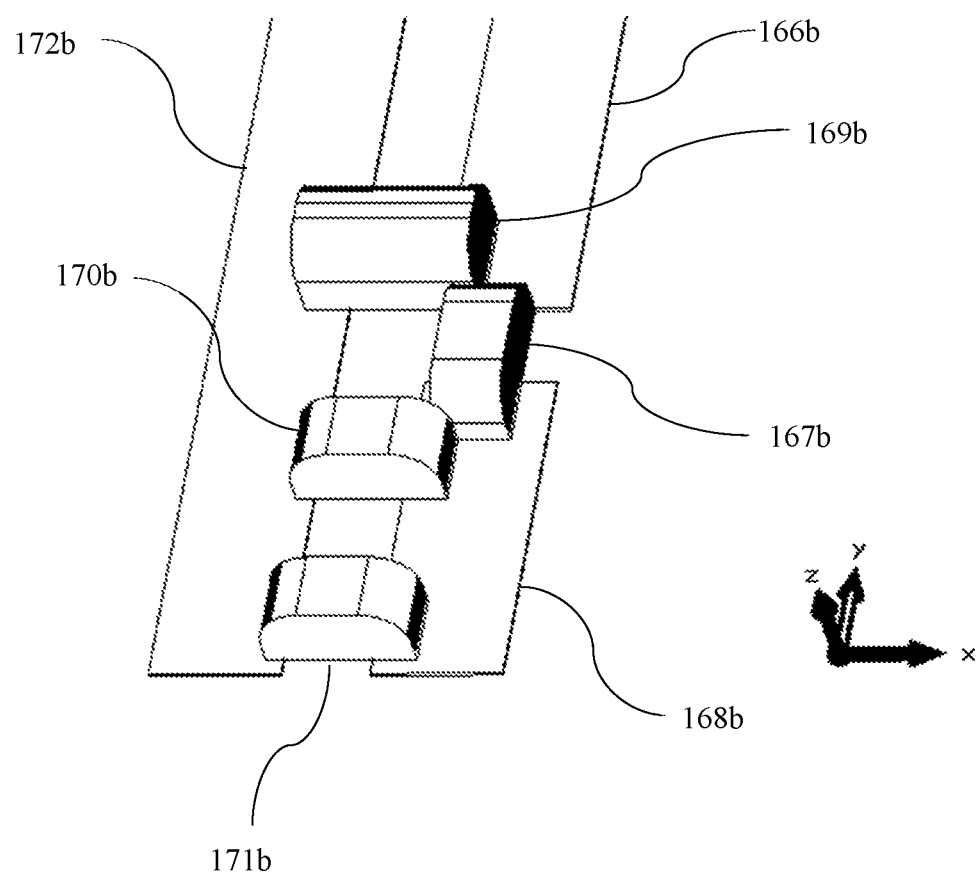
FIG. 5B shows a perspective view illustrating the configuration of the rectifier of FIG. 4 connected to the feed line of the antenna of FIG. 2.

FIGS. 5A and 5B show the configuration of the rectifier 161a or 161b connected to a feed line of the antenna 142b. In some embodiments, the feed line for the antenna may include a coplanar stripline having two parallel conducting strips. More particularly, the feed line structure of various embodiments may differ from a conventional microstrip transmission line structure that may consist of a conducting strip attached to a top surface of a substrate and a metal ground strip attached to a bottom surface of the substrate. The coplanar stripline in various embodiments is a twin-wire structure that may have two parallel conducting strips printed on the same side of the substrate (e.g., the substrate 141a or 141b) and no metal ground plane on the other side of the substrate. The arms of each dipole of the antenna are electrically connected to the two parallel conducting strips respectively. For example, for the first asymmetric dipole, the first arm 143 may be connected to the first conducting strip 149 and the second arm 148 may be connected to the second conducting strip 150. For the second asymmetric dipole, the third arm 144 may be connected to the second conducting strip 150 and the fourth arm 147 may be electrically connected to the first conducting strip 149. For the symmetric dipole, the fifth arm 145 may be connected to the first conducting strip 149 and the sixth arm 146 may be electrically connected to the second conducting strip 150. The coplanar stripline may be an extension from the antenna 142b. A first strip 172a (which may be similar to and/or equivalent to the first conducting strip 149 of FIG. 3A) may be a strip which may have a negative voltage output. A first terminal 181a associated with the first strip 172a may be electrically connected to one pole of antenna 142b. A second terminal 186a associated with a second strip 166a may be connected to the other pole of antenna 142b. The second strip 166a may be similar to and/or equivalent to the second conducting strip 150 of FIG. 3A. A gap between a second terminal 182a associated with the second strip 166a and a third terminal 183a associated with a third strip 168a may be used for mounting a RF choke. An inductor 167a (e.g., 47 nH) may be used as the RF choke. A diode or rectifier 169 may be electrically shunt connected between the first strip 172a and the second strip 166a and mounted above (as illustrated) the inductor 167a. A shunt capacitor 170a (e.g., 100 nH) may be used as a low pass filter for smoothing the DC ripple voltage at the output. The capacitor 170a may be mounted after the diode 169a and the inductor 167a and/or electrically connected between the first strip 172a and the third strip 168a. A resistor 171a may be used as the load, and electrically connected between a fourth terminal 184a associated with the first strip 172a and a fifth terminal 185a associated with the third strip 168a. A positive output voltage across the resistor may be observed at the third conducting strip 168a.

The rectifier 161B, in accordance to various features described herein, may be further simplified by using a single shunt diode as the rectifier 160 (e.g., without 167a and 170a). However, the power conversion efficiency of the rectifier 160 may be improved and the ripple of the output voltage may be decreased in various embodiments by inclusion of the RF choke 167A and the shunt capacitor 170A. Inclusion of the aforementioned two components, namely the shunt capacitor 170a and the inductor 167a, may improve the overall performance of the rectenna 300.

FIG. 5B shows a perspective view illustrating the configuration of the rectifier 161a in FIG. 4 or 5A connected to the feed lines 149 and 150 of the antenna 142b in FIG. 3A. The rectenna 300 may be fabricated on substrate 141b (e.g., the one-sided Duroid® 6002 substrate made by Rogers Corporation). In various embodiments, the circuit components of the rectifier 161b may include a surface mountable chip inductor 167b and a chip capacitor 170b that are suitable for rectifiers fabricated on printed circuit boards. The chip inductor 167b may be connected between the conducting strips 166b and 168b, the packaging size of the chip inductor 167b may be, for example, a conventional 0603 with a width of approximately 0.8 mm, a length of approximately 1.6 mm and a height of approximately 0.8 mm. The chip capacitor 170b and the chip resistor 171b may have the same packaging size (0603), and may be connected between the conducting strips 172b and 168b. The diode 169b may, for example, be a Schottky barrier diode with the packaging dimension of SC-79 (e.g., height: 1 mm, width: 1.3 mm, and length: 2.2 mm), and connected between the conducting strips 172b and 166b.

Figure 6A:
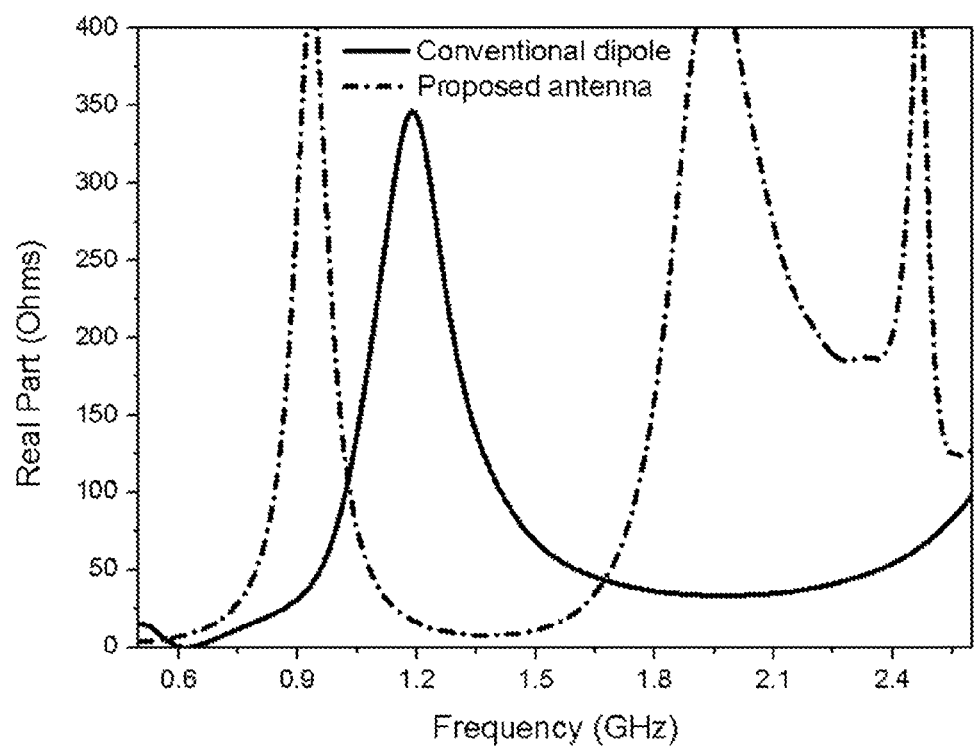
FIG. 6A shows a graph depicting the simulated real part impedance of the antenna in FIG. 2 compared with the simulated real part impedance of a conventional center fed dipole antenna.
Figure 6B:
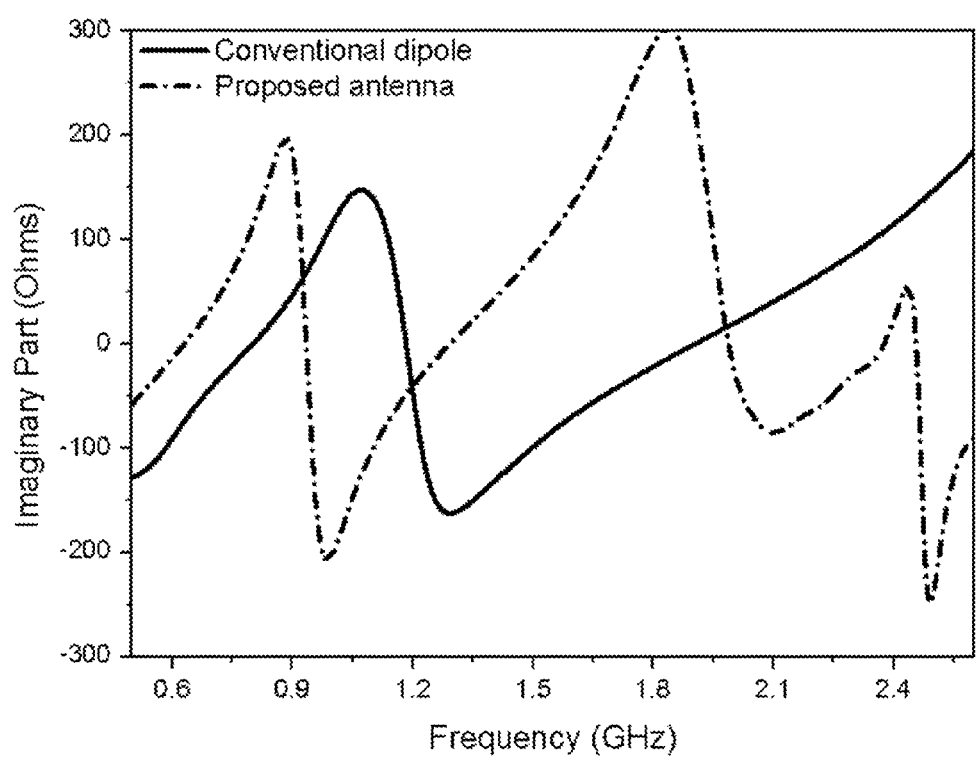
FIG. 6B shows a graph comparing the simulated imaginary input impedance of the antenna of FIG. 2 compared with the simulated imaginary input impedance of a conventional center fed dipole antenna.

FIG. 6A and FIG. 6B compare the simulated real part and imaginary part of the impedance between the OCF dipole antenna 142b and a conventional dipole antenna respectively. The OCF dipole antenna 142b and the conventional dipole antenna used for the simulations of FIGS. 6A and 6B may have substantially similar dimensions but the conventional dipole antenna used for the simulations has a center feed with identical dipole arms. FIGS. 6A and 6B show that the impedance of the proposed OCF dipole antenna 142b is much higher than the impedance of the conventional dipole at frequencies near 0.9 GHz and frequencies between 1.8 GHz and 2.5 GHz. Also the imaginary part of the impedance of the OCF dipole achieves wider resonance and anti-resonance frequency regions, wherein the value at approximately 0.9 GHz and between about 1.8 GHz-2.5 GHz may vary between −300 ohms and 300 ohms. The wider regions of resonance and anti-resonance frequencies may enable improved impedance conjugate matching between the antenna 142b and the rectifier 160.

In some embodiments, for a range of operating conditions, such as input power levels from −30 dBm to 20 dBm, operating frequencies from 0.9 GHz to 2.5 GHz, and load resistances from 300 ohms to 2000 ohms, the predicted (simulated) input impedance of the rectifier 160 may vary between (200+j700) Ω and (20−j600)Ω. The input impedance of the aforementioned OCF antenna 142b (which may be, similar to and/or equivalent to, the antenna 140 of FIG. 1B or the antenna 142a of FIG. 2) may conjugate match to the impedance of the rectifiers 161a or 161b under the aforementioned range of operating conditions. In some embodiments, the antenna 142a and the rectifier 160, 161a or 161b may comprise the rectenna 300.

Figure 7A:
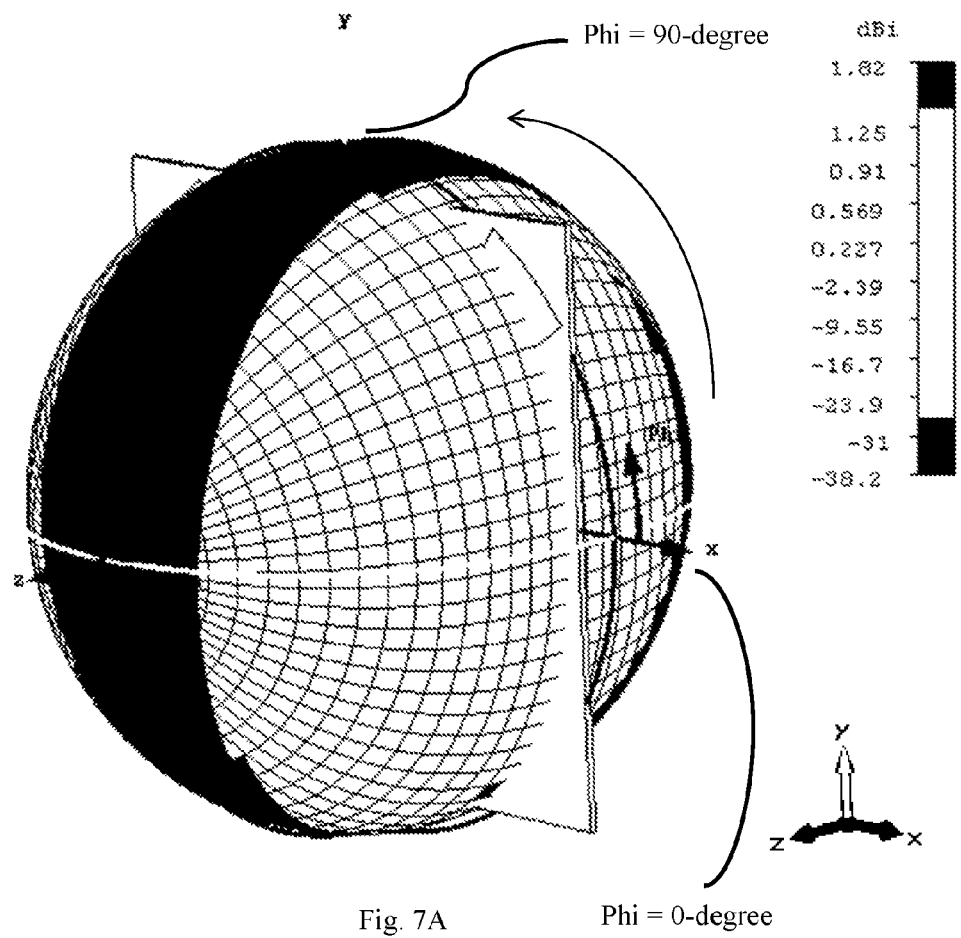
FIG. 7A shows a graph depicting a 3D antenna radiation pattern at 0.9 GHz of an antenna according to various embodiments.
Figure 7B:
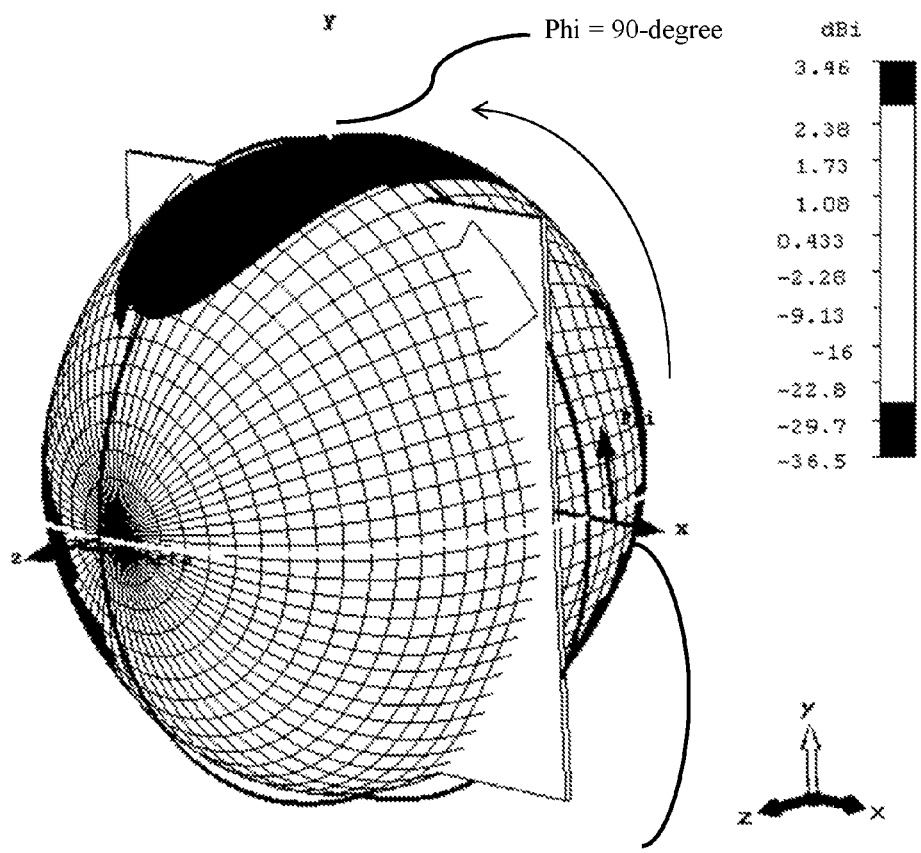
FIG. 7B shows a graph depicting a 3D antenna radiation pattern at 1.8 GHz of a rectenna according to various embodiments.
Figure 7C:
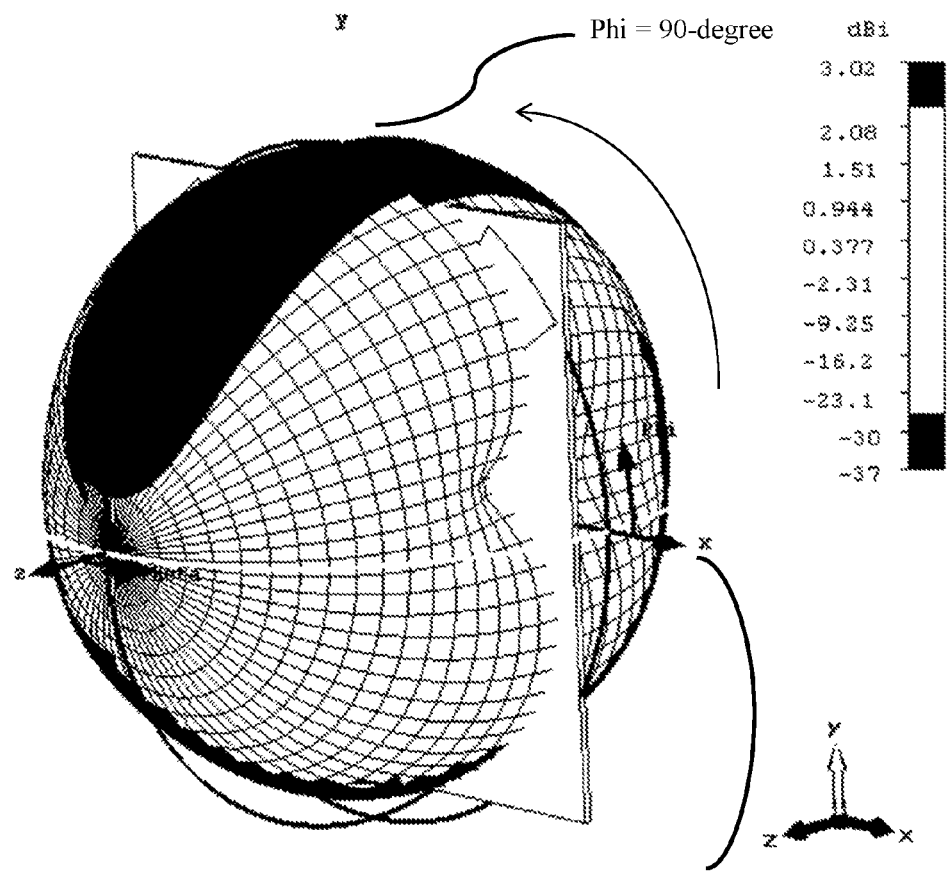
FIG. 7C shows a graph depicting a 3D antenna radiation pattern at 2.1 GHz of a rectenna according to various embodiments.
Figure 7D:
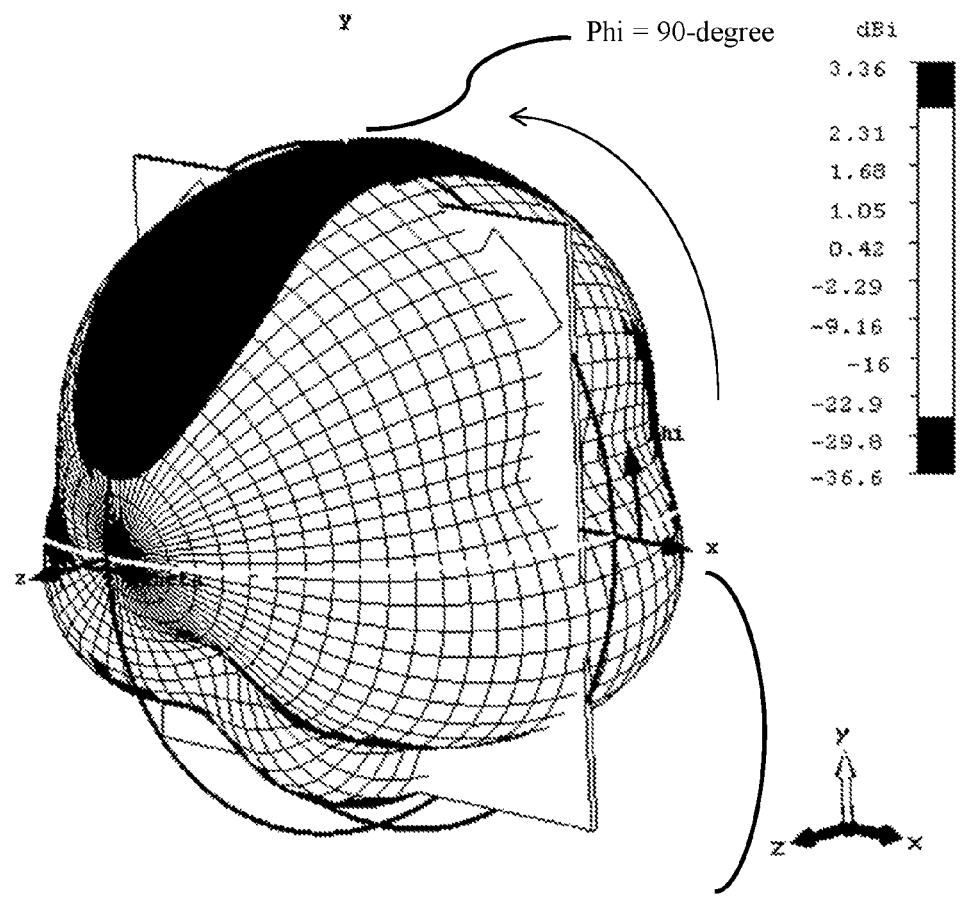
FIG. 7D shows a graph depicting a 3D antenna radiation pattern at 2.4 GHz of a rectenna according to various embodiments.

Referring now to FIG. 7A, FIG. 7B, FIG. 7C and FIG. 7D, simulated 3D radiation patterns and gains for the OCF antenna 142b have been shown in accordance to the features of the embodiments. In some embodiments, FIG. 7A shows that the antenna 142b achieves a bidirectional radiation pattern and a maximum gain of around 1.82 dBi at frequencies of approximately 0.9 GHz. This may be an advantage for ambient wireless energy harvesting applications wherein wireless electromagnetic signals may be received from varying directions within the environment. In some embodiments, FIGS. 7B, 7C and 7D show that the antenna 142b pattern may be more directive around frequencies of 1.8

GHz, 2.1 and/or 2.4 GHz, wherein the maximum gain may be about 3.3 dBi (e.g., 3.46 dBi, 3.02 dBi and 3.36 dBi, respectively) at Phi (as marked in the figures) equals to 90-degree. In some aspects, it may be favorable to use a predetermined source (e.g., a directive antenna) transmitting a fixed RF power and using the rectenna 300 to receive the power over a certain distance for WPT applications. In some embodiments, the rectenna is configured to receive the power at its maximum gain directions (e.g., Phi=90-degree).

The RF-to-DC power conversion efficiency is one parameter indicative of the performance of a rectenna, and the RF-to-DC power conversion may be calculated using the following equation 1, where V is the output DC voltage, R is the load resistance and $P_{in}$ is the input power to the rectifier.

$$\eta_{RF-DC} = \frac{V^2}{R \times P_{in}} \qquad \text{[Equation 1]}$$

Figure 8:
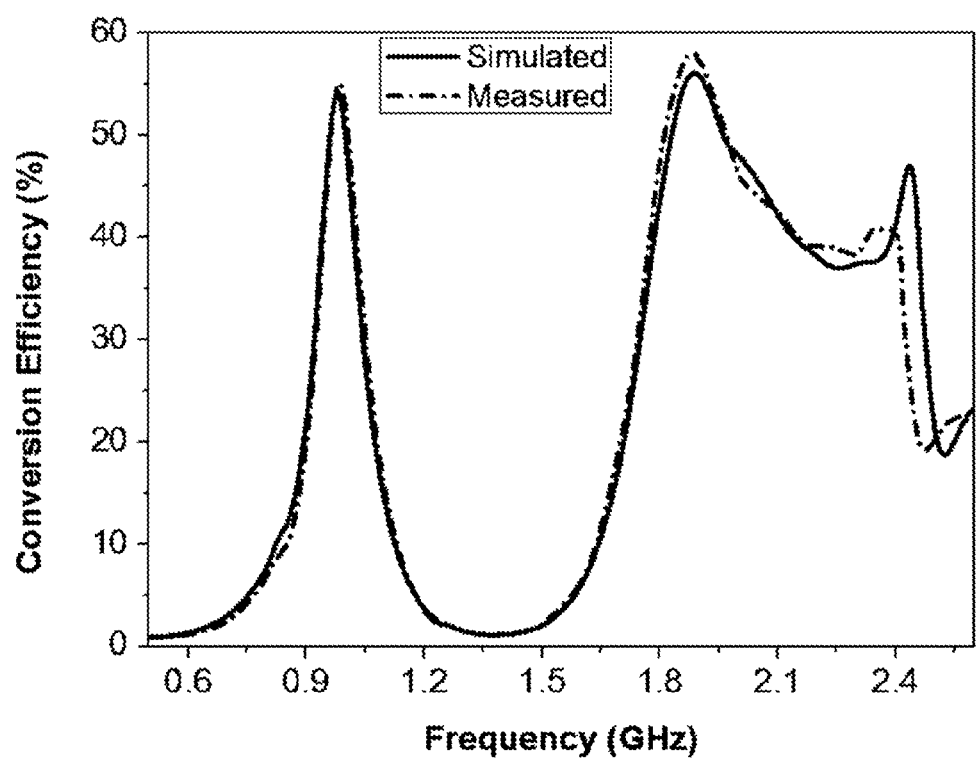
FIG. 8 shows a graph depicting simulated and measured RF-to-DC power conversion efficiency for the rectenna disclosed herein as a function of operating frequency.

The simulated and measured RF-to-DC power conversion efficiencies of the rectenna 300 (e.g., 142b and 161a), in accordance various aspect, are depicted in FIG. 8. The diode modeled and used is a Schottky barrier diode SMS 7630, provided from Skyworks Inc. The load resistance is 500Ω, and input power level is −10 dBm. The peak efficiency of 55% may be realized at frequencies around 0.9 GHz and frequencies around 1.8 GHz, while the efficiency is greater than 40% over a broad range of frequencies (such as from 0.95 GHz to 1.1 GHz, and from 1.75 GHz to 2.45 GHz). The antenna 142B demonstrates that a substantial percentage of the received RF power may indeed be delivered to the rectifier (e.g., using a diode 160, 162, 169 such as SMS7630 from Skyworks, HSMS850, 2860 from Avago) without using an impedance matching network. As aforementioned, the impedance of the OCF antenna 142b directly conjugate matches to the impedance of the rectifier 160 (e.g., within 50 percent, for a reflection coefficient smaller than −6 dB).

The diode disclosed herein may preferably be a Schottky GaAs barrier diode. For WPT applications using a predetermined source (e.g., a directive transmitting antenna), the conditions for the diode according to various features may include a high breakdown voltage (e.g., greater than 5 V) and a high saturation current (e.g., greater than 5 µA) that may help achieve a high output voltage (e.g., up to 10 V) and high power conversion efficiency (e.g., up to 90%) under high power transmission (e.g., greater than 10 dBm) conditions. In other variations for ambient wireless energy harvesting applications, a low forward bias voltage and small series resistance of the diode enable the device to detect small signals (e.g., signal power is less than −20 dBm) while maintaining good overall power conversion efficiency (e.g., greater than 30%). For the WPT applications using the predetermined source (e.g., a directive transmitting antenna), the selected diodes may be of type HSMS 2820 and HSMS 2860, provided from Avago Technologies. The diodes named HSMS 2850 (from Avago) and SMS 7630 (from Skyworks) may be suitable for the ambient wireless energy harvesting applications.

Different types of diodes may have different equivalent circuits that may each result in different input impedances. The conventional rectenna system 200, as shown in FIG. 1A, may not be suitable for connecting to different diodes, since the impedance matching network 110 is designed to transform the rectifier impedance to 50Ω, the operational parameters of the conventional rectenna system 200 may be very sensitive to variations of impedances associated with the different diodes. According to a feature of the embodiments, the rectenna is configured to have a very high input impedance for both the OCF dipole antenna and the rectifier resulting in a conjugate matched high impedance system. The impedance variation associated with the use of different types of diodes is reduced in such a high impedance conjugate matched system and the rectenna may maintain a high power conversion efficiency for different types of diodes.

Figure 9:
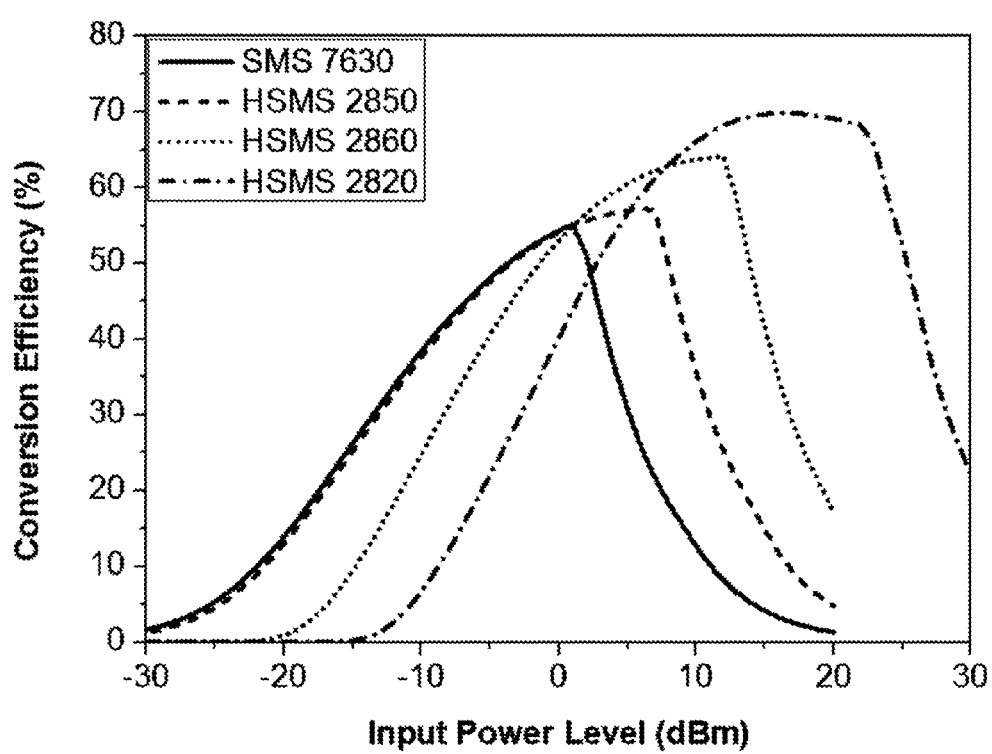
FIG. 9 shows a graph depicting RF-to-DC power conversion efficiency versus input power level for a rectenna using different types of diodes according to various embodiments.

FIG. 9 shows a graph of RF-to-DC power conversion efficiency versus input power level for the rectenna using different types of diodes. The frequency of operation is approximately 0.9 GHz while the load resistance is approximately 500Ω.

Figure 10:
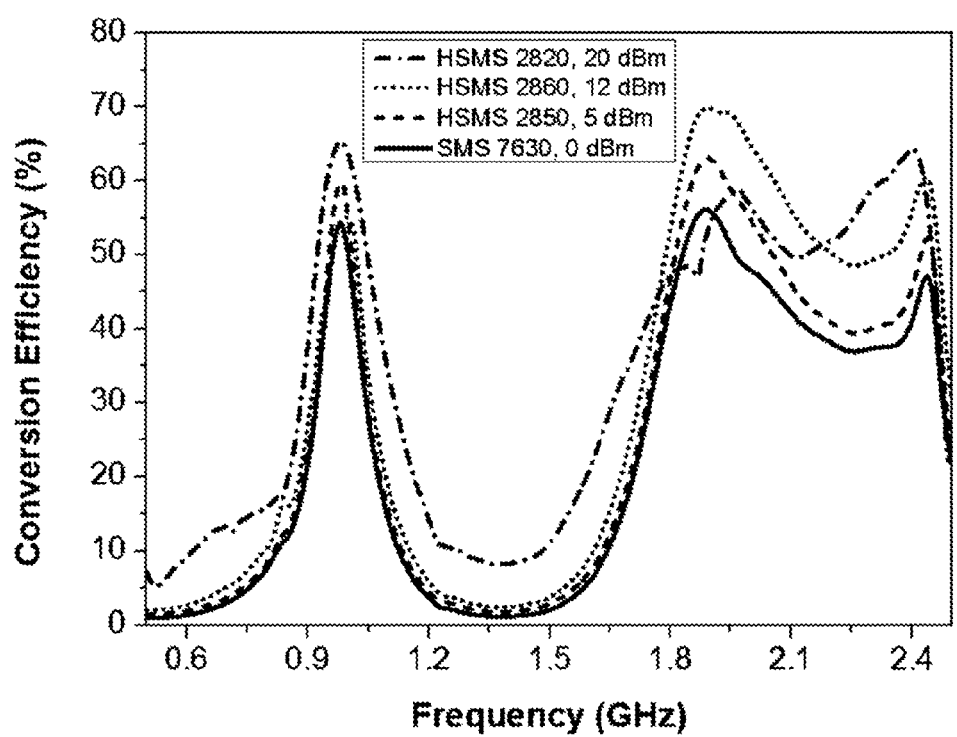
FIG. 10 shows a graph depicting frequency dependent RF-to-DC power conversion efficiency of a rectenna using different types of diodes and input power levels according to various embodiments.

As depicted in FIG. 9, the input RF power at the given frequency and load value could be well delivered to the rectifier, even if the types of the diodes are very different. The realized peak power conversion efficiency (with the corresponding input power level) for using different types of diodes is given as follows, 58% at 0 dBm (SMS 7630), 60% at 5 dBm (HSMS 2850), 65% at 12 dBm (HSMS 2860), and 70% at 20 dBm (HSMS 2820). The power conversion efficiency for low input power levels is different since each diode has its unique forward bias voltage. According to a feature of the embodiments, the performance of the rectenna using the SMS 7630 diode and the HSMS 2850 diode is the best for low input power applications. FIG. 10 shows a graph of frequency dependent RF-to-DC power conversion efficiency for the rectenna disclosed herein corresponding to different types of diodes and input power levels. At the optimal input power level for realizing the peak power conversion efficiency, the rectenna still has maintained performance in terms of the power conversion efficiency as well as the bandwidth. More particularly, it does not matter what type of diode is implemented in the design, the rectenna consistently maintains a high power conversion efficiency over a broad range of operating frequencies such as from 0.9 GHz to 1.1 GHz, and/or from 1.8 GHz to 2.4 GHz.

Figure 11:
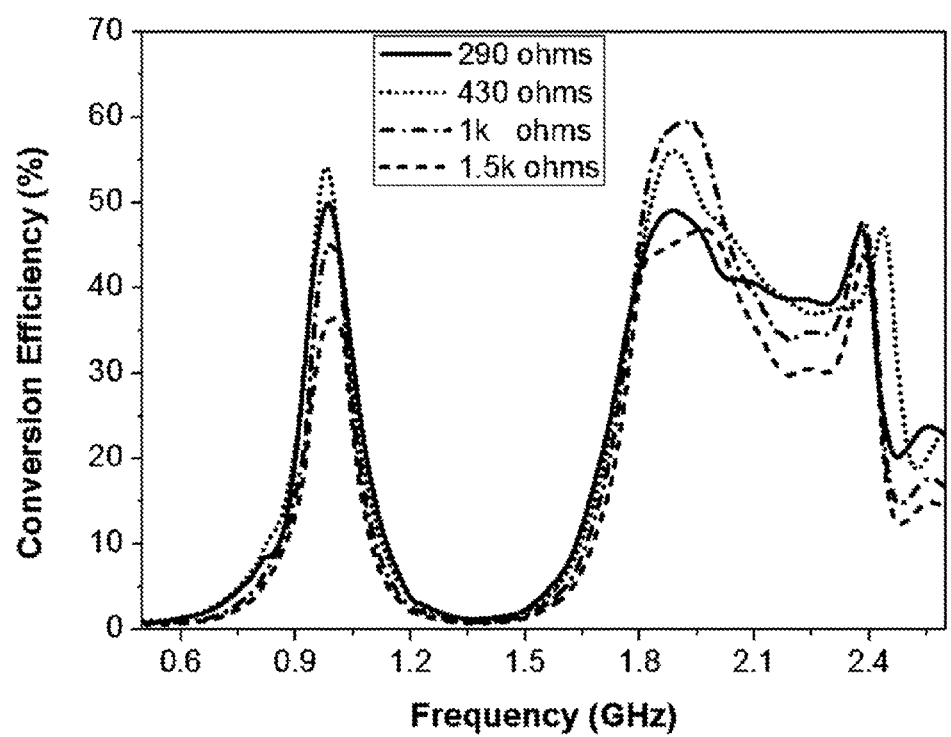
FIG. 11 shows a graph depicting simulated frequency dependent RF-to-DC power conversion efficiency of the rectenna disclosed herein for different load values.

In some embodiments, variations in load impedance and/or resistance may not influence the performance of the rectenna 300. FIG. 11 shows a graph depicting simulated frequency dependent RF-to-DC power conversion efficiency of the rectenna 300 disclosed herein corresponding to different load values. The load may be replaced by resistors with different values such as 290Ω and 1500Ω, while the design of the rectenna 300 is not modified. The input power is −10 dBm, and type of diode is SMS 7630. FIG. 11 shows that the power conversion efficiency is well maintained in a range of load values from 300Ω to 1500Ω.

The foregoing description of the features of the embodiments demonstrates that the conventional rectenna system may be significantly improved and simplified by using the technologies in accordance to the various embodiments described herein. The design of a high impedance antenna (such as the antenna 142b) may enable a rectifying circuit (such as the rectifiers 161a or 161b) to be directly connected to the high impedance antenna without the need for an impedance matching network (such as the impedance matching network 110) that is conventionally connected between an antenna and a rectifying circuit. Therefore, this approach circumvents the complexities associated with a design of impedance matching networks, and the high impedance of the antenna greatly reduces the influence of non-linearities associated with the rectifying circuit 161b on the overall performance of the rectenna 300. The rectenna 300, in accordance with the embodiments described herein, may achieve high efficiency WPT and ambient RF energy harvesting capabilities, under varying operating conditions and for different types of rectifiers.

Although selected features of the embodiments have been shown and described, it is to be understood the embodiments are not limited to the described features. Instead, it is to be appreciated that changes may be made to these features without departing from the principles and spirit of the embodiments, the scope of which is defined by the claims and the equivalents thereof.

The invention claimed is:

1. An apparatus comprising:
   an off-center-fed dipole antenna configured to receive a radio frequency (RF) signal, wherein the off-center-fed dipole antenna comprises:
      a substrate;
      a first off-center-fed dipole, including a first arm and a second arm disposed on the substrate;
      a second off-center-fed dipole, including a third arm and a fourth arm disposed on the substrate;
      a center-fed dipole, including a fifth arm and a sixth arm disposed on the substrate; and
      a coplanar stripline disposed on the substrate, the coplanar stripline having a first conducting strip that connects to the first, the fourth, and the fifth arms, and having a second conducting strip that connects to the second, the third, and the sixth arms; and
   a rectifying circuit connected to the coplanar stripline and configured to convert alternating current (AC) power generated by the off-center-fed dipole antenna to direct current (DC) power, wherein the rectifying circuit comprises a rectifying diode connected between the first conducting strip and the second conducting strip, an inductor serially connected between the second conducting strip and a third conducting strip, and a capacitor connected between the first conducting strip and the third conducting strip.

2. The apparatus of claim 1, wherein the first off-center-fed dipole comprises:
   a pitch angle of approximately 45 degree to the coplanar stripline;
   a ratio of approximately 7/3 for a length of the first arm to a length of the second arm; and
   a radial stub structure for the first arm and the second arm.

3. The apparatus of claim 2, wherein the radial stub structure comprises a sector angle of approximately 20 degrees for the first arm, and a sector angle of 30 degrees for the second arm.

4. The apparatus of claim 1, wherein the second off-center-fed dipole comprises:
   a pitch angle of approximately 90 degrees to the first off-center-fed dipole;
   a pitch angle of approximately 45 degrees to the coplanar stripline;
   a ratio of approximately 7/3 for a length of the third arm to a length of the fourth arm; and
   a radial stub structure for the third arm and the fourth arm.

5. The apparatus of claim 4, wherein the radial stub structure for the third arm and the fourth arm comprises a sector angle of approximately 20 degrees for the third arm, and a sector angle of approximately 30 degrees for the fourth arm.

6. The apparatus of claim 1, wherein the center-fed dipole comprises:
   a pitch angle of approximately 90 degrees to the coplanar stripline;
   a pitch angle of approximately 45 degrees to the first off-center-fed dipole;
   a pitch angle of approximately 45 degrees to the second off-center-fed dipole; and
   a radial stub structure for the fifth arm and the sixth arm.

7. The apparatus of claim 6, wherein the radial stub structure comprises a sector angle of approximately 30 degrees for each of the fifth arm and the sixth arm.

8. The apparatus of claim 1, wherein an impedance of the off-center-fed dipole antenna is substantially conjugate matched to an impedance of the rectifying circuit.

9. The apparatus of claim 1, wherein an impedance of the off-center-fed dipole antenna is conjugate matched to an impedance of the rectifying circuit based on a ratio of a length of the first arm to a length of the second arm, and wherein the apparatus is configured to have a range of operating frequencies centered around 0.9 GHz.

10. The apparatus of claim 1, wherein the apparatus is configured to have a range of operating frequencies between 1.8 GHz and 2.4 GHz.

11. An apparatus comprising:
   an off-center-fed dipole antenna comprising at least six dipole arms that are configured to receive radio frequency (RF) signals;
   a coplanar stripline comprising a first conducting strip, a second conducting strip, and connections to the at least six dipole arms; and
   a rectifying circuit connected to the off-center-fed dipole antenna via the coplanar stripline, wherein the rectifying circuit comprises a rectifying diode connected between the first conducting strip and the second conducting strip, an inductor serially connected between the second conducting strip and a third conducting strip, and a capacitor connected between the first conducting strip and the third conducting strip, wherein the rectifying circuit is configured to convert the RF signals received by the off-center-fed dipole antenna to direct current (DC) power, and wherein an impedance of the off-center-fed dipole antenna is conjugate matched to an impedance of the rectifying circuit.

12. The apparatus of claim 11, wherein the at least six dipole arms comprise:
   at least one symmetric dipole; and
   at least two asymmetric dipoles.

13. The apparatus of claim 12, wherein the at least two asymmetric dipoles comprise:
   a first asymmetric dipole including a first arm and a second arm, wherein a length of the first arm is greater than twice a length of the second arm; and
   a second asymmetric off-center-fed dipole including a third arm and a fourth arm, wherein a length of the third arm is greater than twice a length of the fourth arm.

14. The apparatus of claim 11, wherein the apparatus is configured to have a first range of operating frequencies that is centered around a frequency of operation of about 0.9 GHz and a second range of operating frequencies between approximately 1.8 GHz to 2.4 GHz.

15. An apparatus comprising:
   an antenna comprising three or more dipoles including at least one symmetric dipole and an asymmetric dipole;
   a coplanar stripline comprising a first conducting strip, a second conducting strip, and connections to the three or more dipoles; and
   a rectifying circuit connected to the antenna via the coplanar stripline, wherein the rectifying circuit comprises a rectifying diode connected between the first conducting strip and the second conducting strip, an inductor serially connected between the second conducting strip and a third conducting strip, and a capacitor connected between the first conducting strip and the third conducting strip, and wherein an input impedance of the antenna is conjugate matched to an impedance of the rectifying circuit to within 50 percent resulting in a reflection coefficient smaller than −6 dB.

16. The apparatus of claim 15, wherein a length of a longer arm of the asymmetric dipole is greater than twice a length of a shorter arm of the asymmetric dipole.

17. The apparatus of claim 16, wherein the asymmetric dipole comprises:
- a pitch angle of approximately 45 degrees to the coplanar stripline; and
- a radial stub structure associated with the shorter arm and the longer arm.

18. The apparatus of claim 16, wherein the at least one symmetric dipole comprises:
- a pitch angle of approximately 90 degrees to the coplanar stripline;
- a pitch angle of approximately 45 degrees to the asymmetric dipole; and
- a radial stub structure associated with a first arm and a second arm of the symmetric dipole.

19. The apparatus of claim 18, wherein the radial stub structure comprises a sector angle of approximately 30 degrees.

* * * * *